Aug. 25, 1931.  J. K. B. RÆDER  1,820,247
METHOD OF AND APPARATUS FOR MAKING GLASS
Filed Sept. 14, 1925   4 Sheets-Sheet 4

Patented Aug. 25, 1931

1,820,247

UNITED STATES PATENT OFFICE

JOHAN KRISTOFFER BJÖRN RÆDER, OF HOLMENKOLLEN, NEAR OSLO, NORWAY, ASSIGNOR, BY MESNE ASSIGNMENTS, TO HARTFORD EMPIRE COMPANY, OF HARTFORD, CONNECTICUT, A CORPORATION OF DELAWARE

METHOD OF AND APPARATUS FOR MAKING GLASS

Application filed September 14, 1925. Serial No. 56,301.

The present invention relates to electric furnaces for melting processes, especially for melting glass, of the kind in which the bath itself acts as a resistance to the electric current and where the charge is melted by being fed into the thus heated glass bath.

The invention is herebelow described particularly with reference to an electric furnace for glass melting. Furnaces of this type which are especially adapted for the production of molten glass suitable for the manufacture of articles such as bottles, window glass and the like could, up to now, not be used owing to various drawbacks connected with the same. The main difficulty in connection with such furnaces was the producing of glass of sufficient purity and sufficiently colourless, owing to the fact that the glassmelt easily took colour from impurities absorbed from the current supplying electrodes.

It has been found that the glassmelt is especially exposed to discoloration by the electrodes if the temperature of its contact surfaces with the same is high. Applicant therefore has found it to be important in contrast to the electrodes commonly used, to work with a melt bath which is comparatively cold near the electrodes, so that the bath is not exposed to any excessive temperature at this place but on the contrary may be cooler than the actual heating zones of the furnace.

This condition may be obtained in various ways, for instance by direct cooling of the electrodes or preferably by reducing the passing resistance between the electrodes and glass bath, which again is obtained by using submerged electrodes of relatively large section and having large contact surfaces against the bath, the area of the contact surfaces of the electrodes exposed to the molten bath being much greater than the area of the portions of the electrodes extending through the walls of the furnace. The electrodes preferably are placed as far as possible away from the actual heating zones and the contact surfaces of such electrodes are relatively large. These electrodes may be disposed in chambers or bays which may be extended downwards and to the sides so as to render it possible to use electrodes having larger sections. Further the contact surfaces may be enlarged and the current density reduced by providing the electrode surfaces with flutes or the like.

The current density of the electrodes according to the invention therefore always is lower than usual for electrodes, preferably being less than 3 amperes per square centimeter instead of from 3 to 9 amperes per square centimeter, as is usual.

Another thing which will tend to cause discoloration of the glass and corrosion of the electrodes is contact with not reacted alkali from the melt. During the melting, parts of such not reacted alkali easily may float to the electrodes and attack the same strongly. Half molten charge is, however, lighter than the completely molten glass and swims on the bath, and the electrodes will be comparatively well protected against attack if they are kept fully submerged in the bath.

The invention contemplates feeding of the glass-making materials downwardly in a mass which will extend well beneath the surface of the molten bath between portions of totally submerged spaced electrodes of relatively large section and having contact over a relatively large surface with the molten glass within the melting chamber of the furnace.

Electric resistance furnaces provided prior to the present invention have commonly employed electrodes which are of relatively small cross section as compared with the cross section of the intervening resistor. Such prior furnaces have been found to be unsatisfactory for the melting of glass with molten glass as a resistor for the reason, among others, that the path for the flow of electric current in such prior furnaces having relatively small electrodes is of necessity relatively small in cross section next to the electrodes as compared with the remainder of the glass bath and consequently more heat will be generated next to the electrodes than at any cross section elsewhere in the bath. The electrodes thus will be exposed to localized zones of relatively intense generated heat and when sufficient current is passed through the molten bath to effect the required heating of the body of the bath, the correspondingly greater heat generated next to the electrodes will cause objectionable and harmful overheating of the electrodes.

According to the present invention, the area of the contact surface of each of such electrodes, that is, the surface through which electric current passes between the molten glass and the electrode, preferably is not materially less and may be greater than the cross sectional area of the molten glass that is disposed in the portion of the furnace between the electrodes. (See Figs. 3 to 7 inclusive of the drawings.) This arrangement permits the desirably low amperage per square centimeter of contact surface of the electrode without preventing the development of the required amount of generated heat in the molten glass and tends to produce uniform current density throughout the entire contact surface of each electrode and uniform flow of current and distribution of generated heat through the intervening molten glass. However, the glass-making batch that is fed downwardly into the molten glass between the spaced cooperative submerged electrodes will serve to reduce the effective cross sectional area of the path for the current at a place intermediate the electrodes. The increased resistance to the flow of current at this place therefore will cause a zone of relatively intense heat at the place where such heat is needed to melt the batch at a satisfactory rate. The electrodes are sufficiently remote from this zone of relatively intense heat to be adequately protected therefrom by the intervening molten glass. This arrangement permits economical use of the generated heat and desirably rapid and effective progressive melting of the oncoming mass of glass batch without subjecting any portions of the electrodes to the attack of superfluous alkali or other harmful chemical or gaseous agents at the surface of the bath and without requiring heating of the electrodes to a temperature high enough to cause any appreciable disintegration or reduction thereof or discoloration of the molten glass.

As protective measures may be mentioned the placing of the electrodes in such way that they do not come in contact with the glass travelling from the feeding opening to the discharge room or section of the furnace, the electrodes being placed in chambers at the side of this path so that the glass giving the contact (the contact glass) remains as far as possible at one end and in the same place.

The material of the electrodes may be coal, graphite, metal plates with or without cooling arrangements etc. Preferably, the electrodes are inserted transversely to the direction of the current in the furnace whereby a small section of the electrodes is obtained where they enter the furnace and a large effective electrode surface with a low current density still retained.

The electrode always is given a comparatively small section at the entrance so that the cooling in this place is small. If the furnace is working continuously it must, as is usual, be provided with melting, refining and discharge rooms or sections. In order in this event to prevent the floating half molten charge from fouling the other parts the feeding may be arranged so that the charge is kept in place near the feeding opening until it is molten, for instance by providing special catching means or a funnel which reaches downwards to or into the half molten mass, such for example as indicated at W in Fig. 6.

Owing to the fact that the bath itself forms the heating source the vault is not exposed to the same extent as in furnaces heated with coal. The radiation through the vault therefore may be utilized for heating of the charge. For this purpose one or more heating chambers may be arranged on the vault, in which chambers the charge is brought and thereafter by hand or by mechanical means placed in the bath. In order to prevent adherence and caking of the material it is necessary that the same, and especially the alkalis are intensively dried before being brought to the heating chambers. If this is not done the material will soon form a pasty, sticky and inconvenient mass whilst it in dried condition will remain in a pulverulent and easily manageable state up to a temperature of more than 700° C. Care must be taken for preventing overheating of the part of the charge nearest the bottom of the chamber. The chamber therefore is provided with a combined scraper and transport arrangement which always removes also the lowest, warmest part of the charge.

Caking of the charge in the heating chamber also may be prevented by charging the alkali and the glass fragments separately and by mixing them with the other constituents of the glass charge only in or near the feeding opening.

Figure 1:
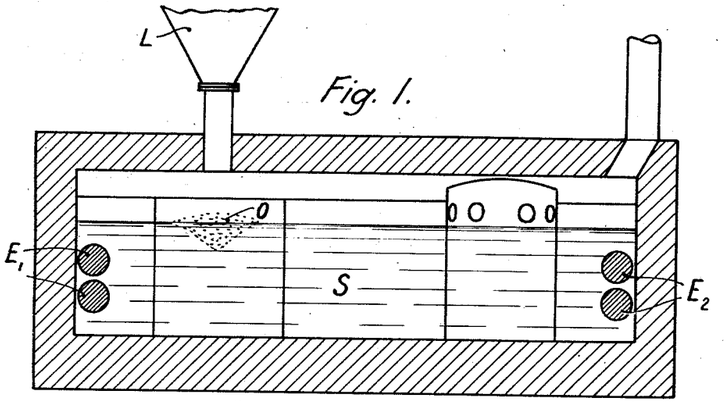
Figures 1 and 2 illustrate a furnace for a single phase current in vertical and horizontal section.
Figure 2:
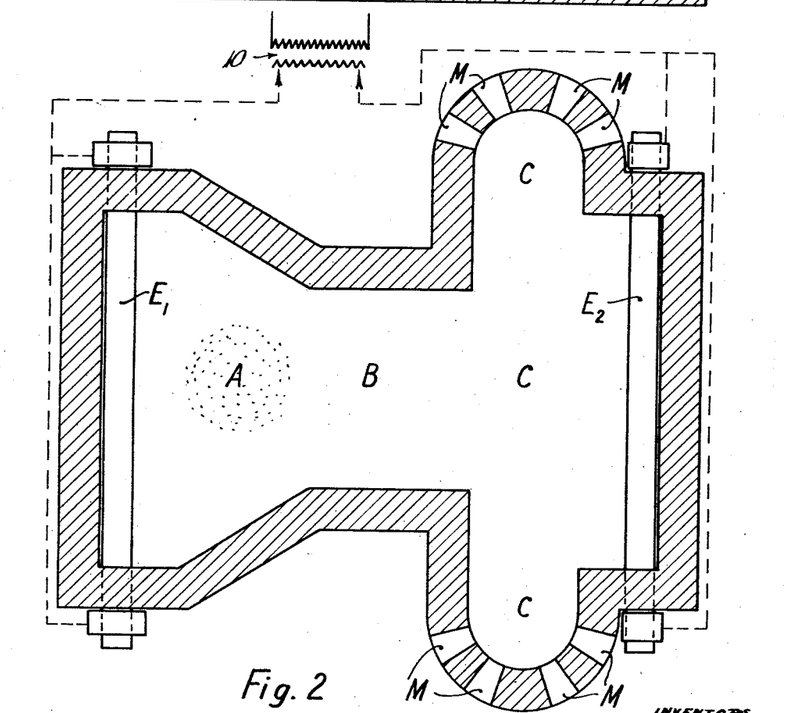

The electric current may be single phase or polyphase current. Figs. 1 and 2 show a furnace for single phase current and Figs. 3 and 4 for three phase current. Preferably more adjustable current circuits are arranged, by coupling and adjusting of which it is possible to distribute the energy in the bath so as to obtain the most advantageous proceeding of the melting.

Figure 4:
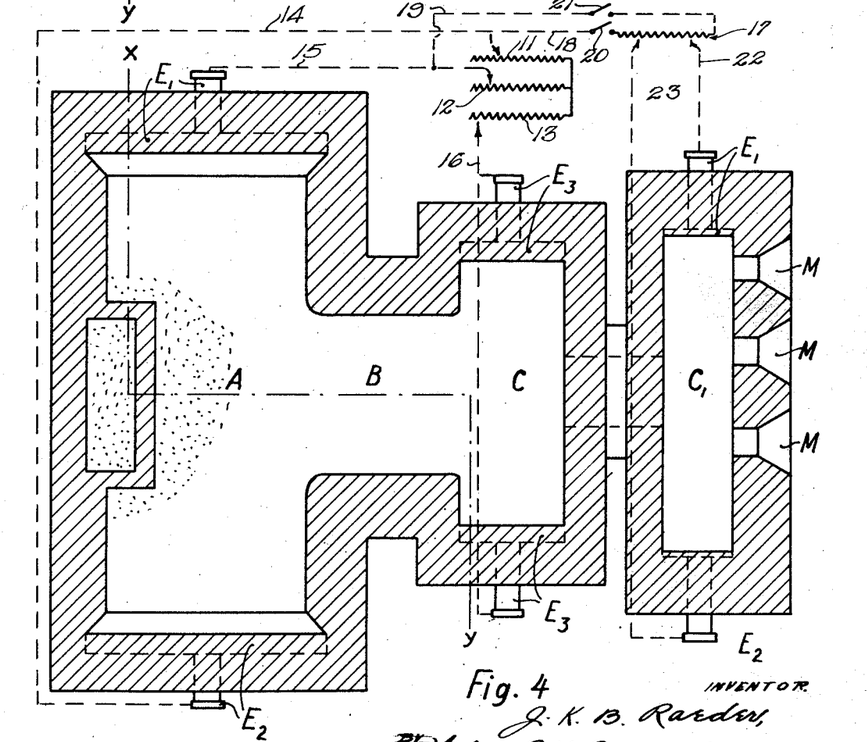
Figure 7:
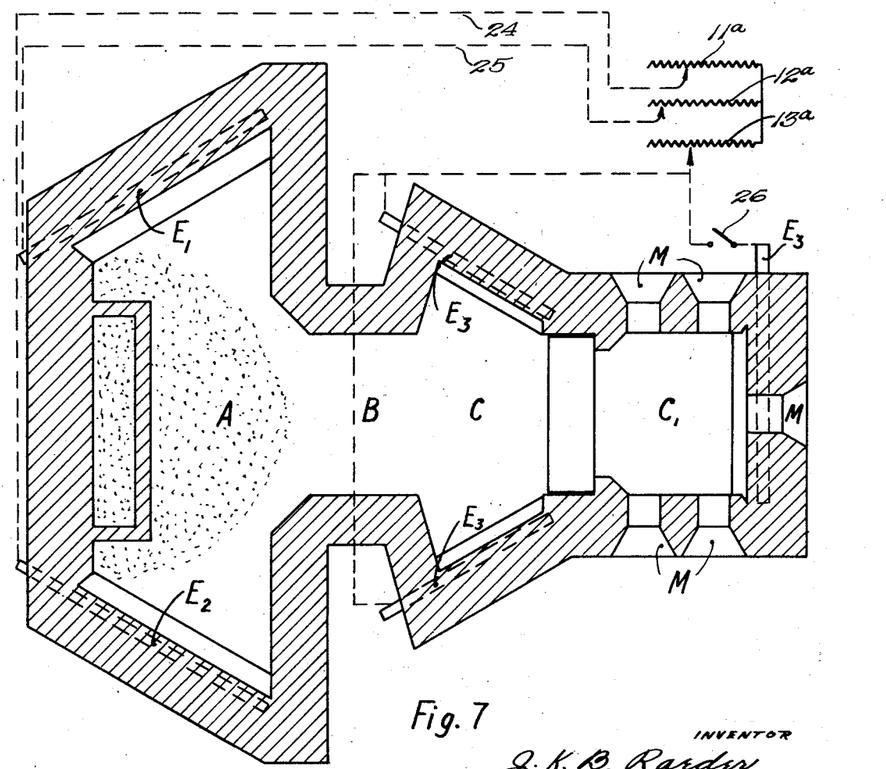

The variable resistances for controlling the current flow through the various circuits are illustrated diagrammatically in Figures 4 and 7.

Examples of furnaces with more current circuits are shown in Figs. 3–7.

In Fig. 2, the terminals of the secondary of an adjustable transformer 10 respectively are connected to the electrodes $E_1$, and $E_2$ so that the flow of current through the glass melt will be longitudinally of the furnace between the electrodes.

In Fig. 4, the numerals 11, 12, and 13 respectively indicate secondary windings of an adjustable transformer which may be used with three-phase current. The secondary winding 11 is adjustably connected by the conductor 14 to the electrode $E_2$ that is located in a bay at one side of the melting compartment A. The electrode $E_1$ that is located in a bay at the opposite side of the compartment A is connected adjustably by the conductor 15 with the secondary winding 12. The winding 13 is connected adjustably by the conductor 16 and its branches with the opposed electrodes $E_3$ which respectively are located in bays at opposite sides of the compartment C. An additional adjustable transformer, indicated at 17, is shown as being connected by the conductors 18 and 19, respectively, with the conductors 14 and 15. Switches 20 and 21 are provided in the conductors 18 and 19. The terminals of the secondary of the transformer 17 are connected by the conductors 22 and 23, respectively, with the electrodes $E_1$ and $E_2$, which respectively are located at opposite sides of the compartment $C_1$.

With the arrangement just described, current will pass through the glass melt transversely of the furnace between the electrodes $E_1$ and $E_2$ in the compartment A and also longitudinally of the furnace through the refining compartment B between the electrodes $E_1$, $E_2$ and the electrodes $E_3$. Also, when the switches 20 and 21 are closed, current will pass transversely of the furnace between the electrodes $E_1$ and $E_2$ of the compartment C and also longitudinally of the furnace through the glass that is passing from the chamber C to the chamber $C_1$.

The arrangement shown in Fig. 7 also is adapted for use with three phase current. The numerals 11a, 12a, and 13a, respectively, indicate the secondary windings of a suitable adjustable transformer. The secondary windings 11a and 12a respectively are connected by the conductors 24 and 25 with the electrodes $E_2$ and $E_1$, which respectively are located in bays at opposite sides of the compartment A. The secondary winding 13a is connected as shown with the two opposed electrodes $E_3$ which respectively are located in bays at opposite sides of the compartment C and also is connected through the switch 26 with the electrode $E_3$ that is located at the front end of the compartment $C_1$. With this arrangement, the current will pass transversely of the furnace through the glass melt between the electrodes $E_1$ and $E_2$ and also longitudinally of the furnace between the electrodes $E_1$, $E_2$, and the pair of opposed electrodes $E_3$ in the compartment C when the switch 26 is open and also to the third electrode $E_3$ at the front end of the furnace when the switch 26 has been closed.

The working principles, as set forth, may be used in connection with glass furnaces of any type and may be adapted for any melt bath used in the glass or similar industry. Although the furnace has been described for use in connection with glass melting, and it is especially applicable for this use, it is obvious that its principle may with advantage be adapted to other melting processes, such as for silicates of soda, zinc, lead or the like, and the invention therefore covers the application of the furnace construction and method for such purposes.

The attached drawings illustrate furnaces designed in accordance with the principles as set forth.

The furnace space preferably is T-shaped and contains the glass bath S. The charge O is inserted in the bath through the funnel L or from the heating chamber Q to the charge room A. From here the molten glass passes through the refining room B to the cooling room C, and from here to the discharge rooms $C_1$ as the glass mass is discharged through the discharge openings M. The electrodes $E_1$, $E_2$, $E_3$ are arranged as described in or at the walls of the furnace. In Figs. 1 and 2 they are shown as horizontal cylindrical bodies placed in the bath whilst the other figures show electrodes built together with the walls and consisting of two sets as described above.

Figure 3:
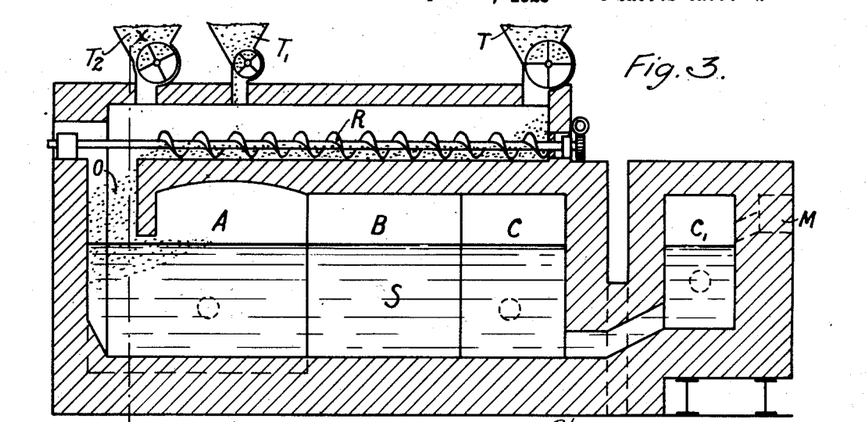
Figures 3 and 4 show a furnace for polyphase current in vertical and horizontal section.
Figure 5:
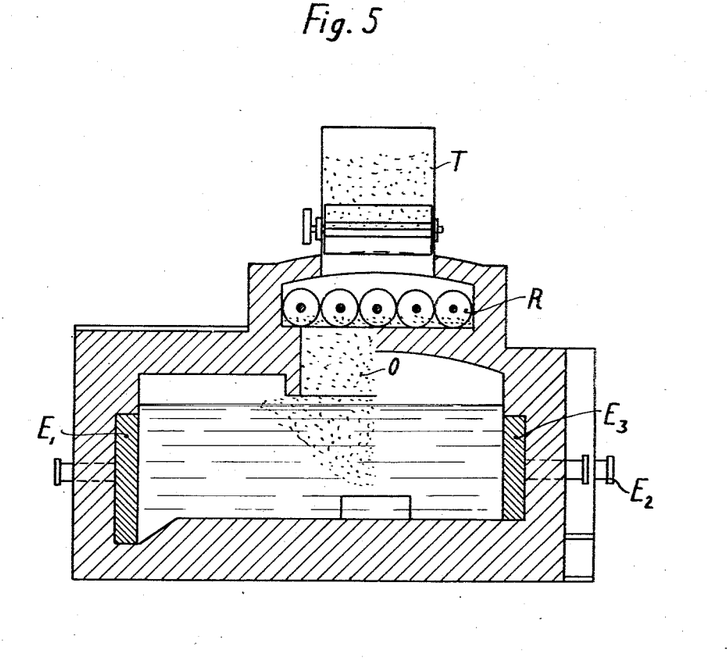
Figure 5 is a section taken on the line $xy$ of Figs. 3 and 4.
Figure 6:
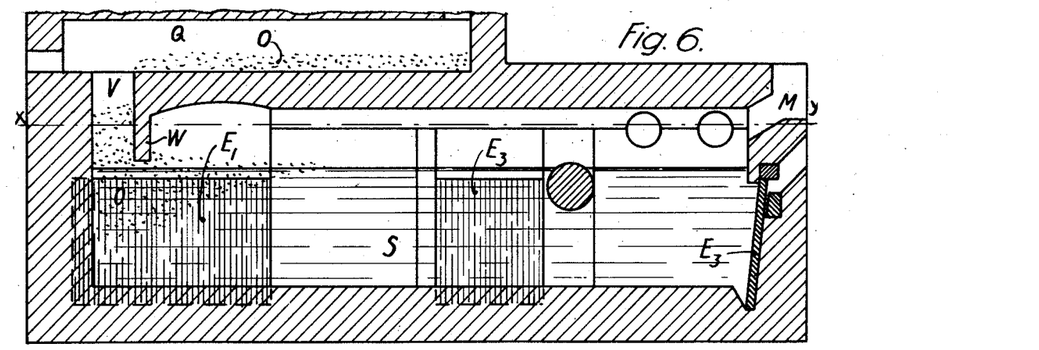
Figures 6 and 7 show a modified form of furnace for polyphase current in vertical and horizontal section.

Furnaces with said heating chambers are shown in Figs. 3, 5 and 6. The letter Q represents heating chambers, R mechanical feeding and scraping devices, T charging silos, eventually arranged in more groups for separate charging of alkali and glass fragments.

By referring particularly to Fig. 7, it will be noted that the spaced cooperative electrodes $E_1$ and $E_2$ in the melting chamber A are disposed in planes which diverge horizontally from the hatch-receiving end portion of the melting chamber toward the end of the melting chamber that communicates with the refining chamber or portion of the furnace. Consequently, the path for the passage of electric current between the two electrodes is shorter at the melting end of the furnace where the specific resistance of part of the intervening material (the partially melted or unmelted batch) is relatively high and is longer in the same horizontal plane near the refining portion of the furnace, where the specific resistance of the intervening material is lower because of the greater fluidity and usually somewhat higher temperature : practically all of such material. Lengthening of the path for the current between the electrodes of course will tend to increase the total resistance to the flow of current along such path. The angle of divergence between the two cooperative electrodes may be such as to partly or completely compensate for variations in the specific resistance of materials along different paths between the electrodes or may be such as to provide a relatively high total resistance between two corresponding points on the electrodes even though the specific resistance of the intervening material is lower between those points than elsewhere. I thus may provide for uniform or controlled electrical heating effects along different paths through the resistance material between the electrodes and different portions of such material thus may be heated more or less or to the same extent according to particular service requirements.

Having thus described the invention what is claimed as new and desired to be secured by Letters Patent is:

1. In apparatus of the class described, the combination with an electric furnace for melting glass or other similar fusible material in which the molten material contained therein acts as a resistance for the electric current, of spaced electrodes disposed within said furnace and positioned therein so as to be totally submerged in the bath, said electrodes extending through the furnace wall, and being enlarged within said furnace in a direction at right angles to the direction of passage of current, said electrodes being fluted, whereby the contact surface is sufficiently great to prevent melting or corrosion of the electrodes.

2. In apparatus of the class described, the combination with an electric furnace for melting glass or other similar fusible material in which the molten material contained therein acts as a resistance for the electric current, of spaced electrodes disposed within said furnace and positioned therein so as to be totally submerged in the bath, said electrodes extending through the furnace wall, and being enlarged within said furnace in a direction at right angles to the direction of passage of current to provide a surface in contact with the glass sufficiently great as compared with the cross-sectional area of the glass between the electrodes to prevent melting or corrosion of the electrodes, and a chamber associated with a wall of the furnace and receiving heat therefrom, the charge being delivered through said chamber to the furnace.

3. In apparatus of the class described, the combination with an electric furnace for melting glass or other similar fusible material in which the molten material contained therein acts as a resistance for the electric current, of spaced electrodes disposed within said furnace and positioned therein so as to be totally submerged in the bath, said electrodes extending through the furnace wall, and being enlarged within said furnace in a direction at right angles to the direction of passages of current to provide a surface in contact with the glass sufficiently great as compared with the cross-sectional area of the glass between the electrodes to prevent melting or corrosion of the electrodes, and a chamber associated with a wall of the furnace and receiving heat therefrom, the charge being delivered through said chamber to the furnace, and a mechanical mixing and transporting device disposed within said chamber.

4. In apparatus for making glass, a tank having a pair of bays in spaced relation longitudinally of the tank in each of its side walls, completely submerged electrodes at the inner sides of such bays, and means for supplying current to the electrodes so as to cause the flow thereof to pass through the glass longitudinally of the tank.

5. In combination in apparatus for making glass, a tank having a pair of bays in spaced relation longitudinally of the tank in each of its side walls, completely submerged electrodes at the inner sides of such bays, and means for supplying current to the electrodes so as to cause the flow thereof to pass through the glass longitudinally of the tank and also transversely thereof.

6. In combination in apparatus for making glass, a melting tank arranged to receive batch at one end and for the delivery of molten glass at the other end, a pair of completely submerged electrodes at each of the opposite side walls of the tank with the members of each pair in spaced relation longitudinally thereof, and means for supplying current to the electrodes so as to cause the flow thereof to pass through the glass longitudinally of the tank.

7. In combination in apparatus for making glass, a melting tank arranged to receive batch at one end and for the delivery of molten glass at the other end, a pair of completely submerged electrodes at each of the opposite side walls of the tank with the members of each pair in spaced relation longitudinally thereof, and means for supplying current to the electrodes so as to cause the flow thereof to pass through the glass longitudinally of the tank and also transversely thereof.

8. In combination in apparatus for making glass, a melting tank arranged to receive batch at the one end and for the delivery of molten glass at the other end, a pair of completely submerged electrodes at each of the opposite side walls of the tank with the members of each pair in spaced relation longitudinally thereof, and means for supplying current to the electrodes so as to cause the flow thereof to pass through the glass longitudinally thereof, the tank being tapered in form so as to decrease in cross section between said longitudinally spaced electrodes.

9. In combination in apparatus for making glass, a melting tank arranged to receive batch at one end and for the delivery of molten glass at its opposite end, completely submerged electrodes within the tank, means for supplying current to said electrodes so as to cause an electric current to flow through the glass in the tank to heat it and to melt the batch received therewithin, means for supplying batch to said one end of the tank, and means for utilizing the heated gases above the glass in the tank to preheat the incoming batch.

10. In combination in apparatus for making glass, a melting tank arranged to receive batch at one end and for the delivery of molten glass at its opposite end, completely submerged electrodes within the tank, means for supplying electric current to said electrodes so as to cause electric current to flow through the glass in the tank to heat it, a chute for supplying batch to said one end of the tank, and means communicating with said chute and located above the glass in the tank for preheating the batch.

11. In combination in apparatus for making glass, a melting tank arranged to receive batch at one end and for the delivery of molten glass at a place remote from said receiving end, spaced totally submerged electrodes within the tank, means for supplying electric current to said electrodes to cause a current to flow through the glass in the tank to heat it, a preheating chamber for the incoming batch, said chamber being adapted to be heated by gases above the glass in the tank, and a feed chute leading from such preheating chamber into the receiving end of said tank.

12. The process of making glass which comprises the steps of supplying batch to one end of an electric resistance tank furnace and withdrawing molten glass from the other end of said furnace, and heating the batch and molten glass in said tank furnace by causing electric current to flow therethrough between electrodes which are totally submerged in the molten glass within the tank.

13. A process of making glass which comprises the steps of supplying glass batch continuously to one end of an electric resistance tank furnace and withdrawing molten glass from the other end of said tank furnace, and heating the batch and the molten glass by causing electric current to flow therethrough longitudinally of the tank and between electrodes which are totally submerged in the molten glass within the tank.

14. A process of making glass which comprises the steps of supplying glass-making batch to one end of an electric resistance tank furnace and withdrawing molten glass from the other end of said tank furnace and heating the batch and the molten glass by causing electric current to flow therethrough both longitudinally and transversely of the tank between totally submerged electrodes within the tank.

15. In an electric furnace for melting glass in which the molten glass acts as a resistance to the electric current, spaced electrodes having their portions within the furnace totally submerged in the molten glass, each of said submerged portions having a relatively large area in section, and means for feeding glass-making batch downwardly in a mass extending beneath the surface of the molten glass in the furnace and between said submerged portions of the electrodes.

16. The method of melting glass in an electric resistance furnace which comprises providing a bath of molten glass in the furnace, passing an electric current through the molten glass between spaced submerged electrodes, feeding glass-making batch to said molten glass at a station located between and at a substantial distance from said electrodes, and causing a relatively greater generation of heat at said batch-receiving station than elsewhere along the path of the current between the electrodes by causing part of the batch fed at said station to descend in the molten glass in the path of said current.

17. In an electric furnace for melting glass in which the molten glass acts as a resistance to the electric current, spaced electrodes submerged in the molten glass in the furnace, means for feeding glass-making batch downwardly in a mass extending beneath the surface of the molten glass and in the path of the current between the electrodes, and means for opposing horizontal movement of said mass of batch in said molten glass.

18. The combination with an electric resistance furnace for the melting of glass in which a bath of molten glass serves as a resistance to the electric current, of spaced electrodes submerged in the molten glass, means for feeding glass-making batch to said molten glass at a station located between portions of said spaced electrodes, the surfaces of contact of said electrodes with the glass lying in divergent planes.

19. The combination with an electric resistance furnace for the melting of glass in which a bath of molten glass serves as a resistance to the electric current, of horizontally spaced electrodes submerged in the glass, means for feeding glass-making batch to the molten glass between portions of said electrodes, said electrodes being so formed and so disposed with relation to each other that the distance through the glass between certain opposite portions of the electrodes is different from the distance through the glass between certain other opposite portions of the electrodes.

20. The method of heating glass in an electric resistance furnace in which a bath of molten glass serves as a resistance to an electric current, comprising the steps of causing a flow of electric current through the molten glass between spaced cooperative electrodes submerged in the glass, and controlling the generation of heat in different portions of the glass between the electrodes by providing different distances for the passage of the electric current through the glass between different portions of the electrodes.

21. The method of heating glass in an electric resistance furnace in which a bath of molten glass serves as a resistance to an electric current, comprising the steps of passing an electric current through the bath between spaced cooperative electrodes, feeding glass-making batch into the molten bath so that part of such batch extends into the path for the passage of part of said current through the molten glass and thereby increases the specific resistance of part of the material between the electrodes and further controlling the total resistance to the passage of current between different portions of the electrodes to regulate the heating effects of the current in different portions of the material between the electrodes.

22. In combination in apparatus for making glass, a tank having a pair of bays in spaced relation longitudinally of the tank in each of its side walls, electrodes at the inner sides of such bays, and means for supplying current to the electrodes so as to cause the flow thereof to pass through the glass longitudinally of the tank.

23. In combination in apparatus for making glass, a tank having a pair of bays in spaced relation longitudinally of the tank in each of its side walls, electrodes at the inner sides of such bays, and means for supplying current to the electrodes so as to cause the flow thereof to pass through the glass longitudinally of the tank and also transversely thereof.

24. In combination in apparatus for making glass, a melting tank arranged to receive batch at one end and to deliver molten glass at the other end, a pair of electrodes in each of the opposite side walls of the tank with the members of each pair in spaced relation longitudinally thereof, and means for supplying current to the electrodes so as to cause the flow thereof to pass through the glass longitudinally of the tank.

25. In combination in apparatus for making glass, a melting tank arranged to receive batch at one end and to deliver molten glass at the other end, a pair of electrodes in each of the opposite side walls of the tank with the members of each pair in spaced relation longitudinally thereof, and means for supplying current to the electrodes so as to cause the flow thereof to pass through the glass longitudinally of the tank, and also transversely thereof.

26. In combination in apparatus for making glass, a melting tank arranged to receive batch at one end and to deliver molten glass at the other end, a pair of electrodes in each of the opposite side walls of the tank with the members of each pair in spaced relation longitudinally thereof and means for supplying current to the electrodes so as to cause the flow thereof to pass through the glass longitudinally of the tank, the tank being tapered in form so that it decreases in vertical cross section from the rear electrodes of said pairs to the forward ones.

27. In combination in apparatus for making glass, a melting tank arranged to receive batch at its rear end and to deliver molten glass at its forward end, means for causing electric current to flow through the glass in the tank to heat it, means for supplying batch to said rear end of the tank, and means for applying the heated gases above the glass in the tank to the incoming batch so as to heat the same.

28. In combination in apparatus for making glass, a melting tank arranged to receive batch at its rear end and to deliver molten glass at its forward end, means for causing electric current to flow through the glass in the tank to heat it, a chute for supplying batch to said rear end of the tank, and means for withdrawing the heated gases lying in the tank above the glass through such chute so as to preliminarily heat the batch.

29. A process of making glass which consists in supplying batch to one end of a tank, withdrawing the molten glass from the other end and heating the batch and molten glass by causing electric current to flow therethrough longitudinally of the tank.

30. A process of making glass, which consists in supplying batch to one end of a tank, withdrawing the molten glass from the other end and heating the batch and molten glass by causing electric current to flow therethrough longitudinally of the tank and transversely thereof.

31. In apparatus for making glass and similar substances, the combination of spaced electrodes in contact with the material in the furnace, said electrodes being fluted on portions thereof in contact with the material within the furnace.

32. A melting tank adapted to receive batch at one end and to deliver molten glass at the other end, a pair of electrodes at each of the opposite side walls of the tank with the the members of each pair in spaced relation longitudinally thereof, and means for supplying current to the electrodes so as to cause a flow thereof to pass through the glass longitudinally of the tank and also transversely thereof.

33. A melting tank arranged to receive batch at one end and to deliver molten glass at the other end, a pair of electrodes at each of the opposite side walls of the tank with the members of each pair in spaced relation longitudinally thereof, means for supplying current to the electrodes so as to cause a flow thereof to pass through the glass longitudinally thereof, the tank being tapered in form so as to decrease in cross section between said longitudinally spaced electrodes.

34. In an electric furnace for melting glass in which the molten glass acts as a resistance to an electric current, spaced electrodes within the furnace submerged in the glass, and means for feeding glass-making batch downwardly into a mass extending beneath the surface of the glass and between upper portions of said electrodes.

35. The method of making glass which comprises establishing a bath of molten glass, passing an electric current through the bath between submerged electrodes, constricting the path of flow of current between the electrodes by opposing the normal spread of the lines of flow by interposing glass-making batch between a wall of the container and a plane connecting the edges of the electrodes nearest the wall.

36. In combination in apparatus for making glass, an elongate tank having transverse bays at its extreme ends extending out past the side walls of the tank intermediate the bays, electrodes constituting a portion of the walls of said bays, means for supplying batch to the tank, and means for supply current to the electrodes so as to cause the flow thereof to pass through the glass longitudinally of the tank.

37. In combination in apparatus for making glass, an elongate tank having transverse bays at its extreme ends extending out past the side walls of the tank intermediate the bays, electrodes constituting a portion of the walls of said bays, means for supplying electric current to the electrodes to cause the flow thereof to pass through the glass longitudinally of the tank, the total area of the electrodes in contact with the glass being greater than the transverse cross-sectional area of the body of glass in the tank intermediate the bays.

38. In combination in apparatus for making glass, an elongate tank having transverse bays at its ends extending out past the sides of the tank intermediate the bays, an outlet in one of said bays, the bottom of the bay having said outlet being at a level above that of the tank intermediate the bays, electrodes constituting a portion of the walls of said bays, and means for supplying electric current to the electrodes so as to cause the flow thereof to pass through the glass longitudinally of the tank.

39. In combination in apparatus for making glass, an elongate tank with its ends in the form of transverse bays extending out past the side walls of the portion of the tank lying between said bays, an electrode in contact with the glass in the one bay, an electrode at each end of the other bay constituting a portion of the end walls of said bay, and means for supplying current to said electrodes to cause a flow through the glass in said portion of the tank lying between the bays.

40. In combination in apparatus for making glass, an elongate tank with its ends in the form of transverse bays extending out past the side walls of the portion of the tank lying between said bays, an electrode constituting a portion of the wall of the one bay, an electrode contacting with the glass in the other bay, and means for supplying electric current to said electrodes to cause a flow through said glass in said portion of the tank lying between the bays.

41. In combination in apparatus for making glass, an elongate tank with its ends in the form of transverse bays extending out past the side walls of the portion of the tank lying between said bays, an electrode contacting with the glass in the rear bay, an electrode at each end of the front bay constituting a portion of the walls of said bay, an outlet for glass through the front wall of the front bay, and means for supplying electric current to said electrodes to cause a flow through the glass in said portion of the tank lying between the bays.

42. An electric resistance glass making furnace in which molten glass serves as a resistance to the flow of an electric current, comprising a chamber containing a bath of molten glass, spaced electrodes totally submerged by the bath, and means for feeding glass-making materials to the bath in a mass that is forced downward partially below the surface of the bath directly between the electrodes without obstructing the entire surface of the bath against the escape of gases and bubbles from the glass.

43. An electric resistance glass making furnace in which molten glass serves as a resistance to the flow of an electric current, comprising a melting and refining chamber containing a bath of molten glass, a conditioning chamber connected with the melting and refining chamber so as to receive molten glass from the lower portion of the latter, spaced submerged electrodes in each of said chambers, independently controllable means for supplying electric current to the electrodes in the respective chambers, and means for feeding glass making materials to the molten glass in the melting and refining chamber.

44. A glass melting furnace comprising a plurality of communicating chambers adapted to hold molten glass in motion, means for passing an electric current through the glass in one of said chambers transversely to the movement of glass therein, and means for passing electric current through the glass in another of said chambers in the direction of the movement of the glass therein.

45. An electric resistance glass-making furnace comprising a melting and refining chamber containing a bath of molten glass, a conditioning chamber connected with the melting and refining chamber so as to receive molten glass from the latter, means for passing an electric current through the glass in the melting and refining chamber substantially at right angles with the direction of movement of the glass therein, and means for passing electric current through the glass in the conditioning chamber substantially in the direction of movement of the glass therein.

46. In an electric resistance glass-making furnace in which molten glass serves as a resistance to the flow of electric current, a melting and refining chamber containing a bath of molten glass, a conditioning chamber connected with the melting and refining chamber so as to receive molten glass from the latter, spaced totally submerged electrodes in each of said chambers arranged to pass electric current through the glass in the two chambers in directions extending substantially at right angles with each other, and independently controllable means for supplying electric current to the electrodes in the respective chambers.

47. The method of melting and conditioning glass which comprises feeding glass-making batch to a bath of molten glass in a melting and refining chamber, passing molten glass from said melting and refining chamber to a conditioning chamber, melting the batch and refining the glass in the first named chamber by passing an electric current therethrough transversely with the direction of movement of the glass therein, and conditioning the glass in the second chamber by passing an electric current therethrough in the direction of movement of the glass therein.

In testimony whereof I have signed my name to this specification at Oslo this 31st day of August 1925.

JOHAN KRISTOFFER BJÖRN RÆDER.